US012683240B2

(12) United States Patent
Shin et al.

(10) Patent No.: US 12,683,240 B2
(45) Date of Patent: Jul. 14, 2026

(54) BATTERY MODULE INCLUDING GAS CUTOFF STRUCTURE

(71) Applicant: LG ENERGY SOLUTION, LTD., Seoul (KR)

(72) Inventors: Eun Gyu Shin, Daejeon (KR); Jeong Oh Moon, Daejeon (KR); Yoon Koo Lee, Daejeon (KR); Eun Ah Ju, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 809 days.

(21) Appl. No.: 17/794,396

(22) PCT Filed: Feb. 26, 2021

(86) PCT No.: PCT/KR2021/002500
§ 371 (c)(1),
(2) Date: Jul. 21, 2022

(87) PCT Pub. No.: WO2021/201443
PCT Pub. Date: Oct. 7, 2021

(65) Prior Publication Data
US 2023/0052417 A1 Feb. 16, 2023

(30) Foreign Application Priority Data
Apr. 1, 2020 (KR) ........................ 10-2020-0039868

(51) Int. Cl.
*H01M 50/383* (2021.01)
*H01M 10/6566* (2014.01)
(Continued)

(52) U.S. Cl.
CPC ..... *H01M 50/383* (2021.01); *H01M 10/6566* (2015.04); *H01M 50/143* (2021.01); *H01M 50/209* (2021.01); *H01M 50/375* (2021.01)

(58) Field of Classification Search
CPC ........... H01M 50/383; H01M 10/6566; H01M 50/143; H01M 50/209; H01M 50/375
See application file for complete search history.

(56) References Cited

U.S. PATENT DOCUMENTS

2009/0142650 A1 6/2009 Okada et al.
2012/0263982 A1* 10/2012 Yasui .................. H01M 10/058
429/61
(Continued)

FOREIGN PATENT DOCUMENTS

CN 104779103 A 7/2015
CN 105280847 A 1/2016
(Continued)

OTHER PUBLICATIONS

Machine translation of KR20140081940A (Year: 2025).*
(Continued)

*Primary Examiner* — Brian R Ohara
*Assistant Examiner* — M. T. Leonard
(74) *Attorney, Agent, or Firm* — Birch, Stewart, Kolasch & Birch, LLP

(57) ABSTRACT

A battery module has a structure capable of preventing spread of flames when fire breaks out in the battery module, and more particularly a battery module including a plurality of battery cell module assemblies, each of the battery cell module assemblies including battery cells arranged in tight contact with each other, a side plate electrically connected to electrode leads of the battery cell module assemblies, a duct disposed outside the side plate, and a gas cutoff structure disposed in the duct, wherein the plurality of battery cell module assemblies is disposed so as to have a space therebetween.

12 Claims, 6 Drawing Sheets

(51) Int. Cl.
    *H01M 50/143*     (2021.01)
    *H01M 50/209*     (2021.01)
    *H01M 50/375*     (2021.01)

(56) References Cited

U.S. PATENT DOCUMENTS

| | | | |
|---|---|---|---|
| 2014/0154541 A1 | 6/2014 | Asakura et al. | |
| 2014/0212708 A1* | 7/2014 | Frey ................... | H01M 50/375 |
| | | | 429/54 |
| 2015/0200066 A1 | 7/2015 | Legendre et al. | |
| 2015/0340665 A1 | 11/2015 | Kim et al. | |
| 2016/0059196 A1 | 3/2016 | McWhorter | |
| 2016/0285142 A1* | 9/2016 | Kimura .............. | H01M 10/657 |
| 2017/0012330 A1 | 1/2017 | Kim et al. | |
| 2021/0104798 A1 | 4/2021 | Jiang et al. | |

FOREIGN PATENT DOCUMENTS

| | | |
|---|---|---|
| CN | 209183604 U | 7/2019 |
| JP | 2007-179873 A | 7/2007 |
| JP | 2009-134900 A | 6/2009 |
| JP | 2011-70871 A | 4/2011 |
| JP | 2011-258426 A | 12/2011 |
| JP | 2013-246920 A | 12/2013 |
| JP | 2014-110138 A | 6/2014 |
| JP | 2015-76216 A | 4/2015 |
| JP | 2015-153616 A | 8/2015 |
| JP | 2016-201333 A | 12/2016 |
| JP | 2018-129240 A | 8/2018 |
| KR | 10-2014-0058759 A | 5/2014 |
| KR | 10-2014-0081940 A | 7/2014 |
| KR | 10-2015-0072685 A | 6/2015 |
| WO | WO 2015/126209 A1 | 8/2015 |

OTHER PUBLICATIONS

Machine translation of JP2016201333A (Year: 2025).*
Machine translation of JP2011258426A (Year: 2025).*
Machine translation of JP2007179873 (Year: 2025).*
Extended European Search Report dated Jul. 6, 2023 for Application No. 21780259.4.
International Search Report (PCT/ISA/210) issued in PCT/KR2021/002500, dated Jun. 7, 2021.

* cited by examiner

【FIG. 1】
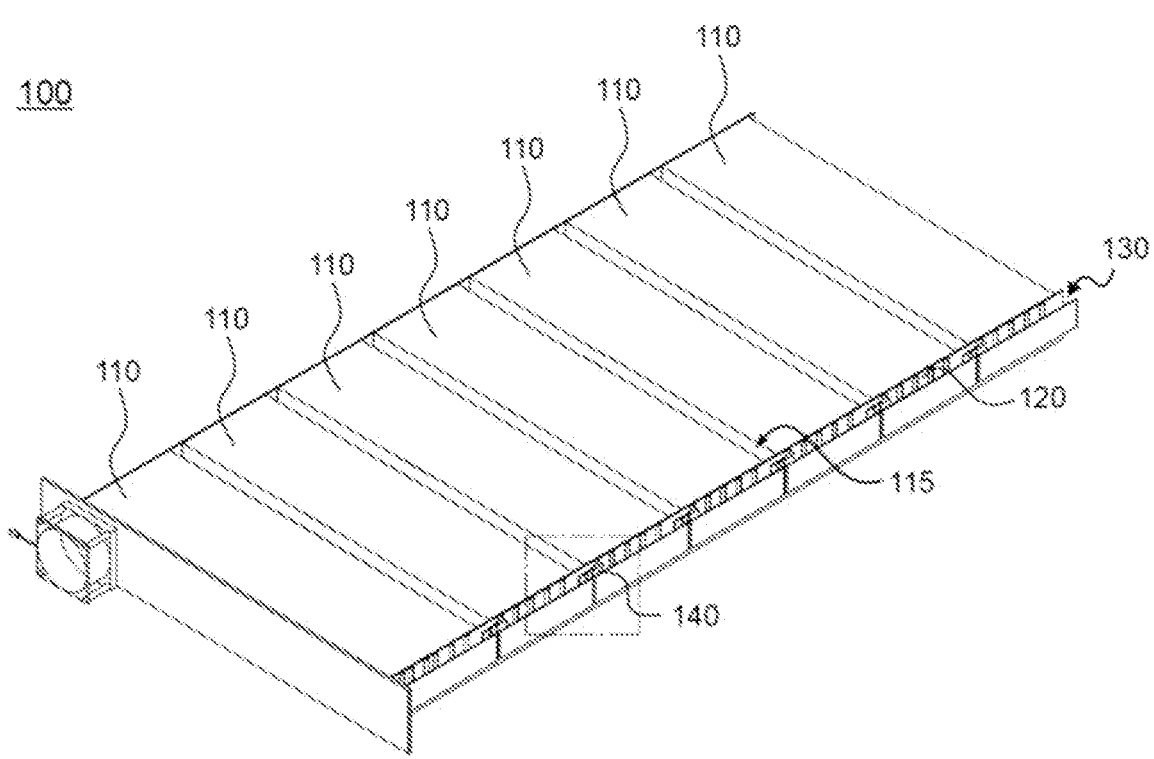

【FIG. 2】
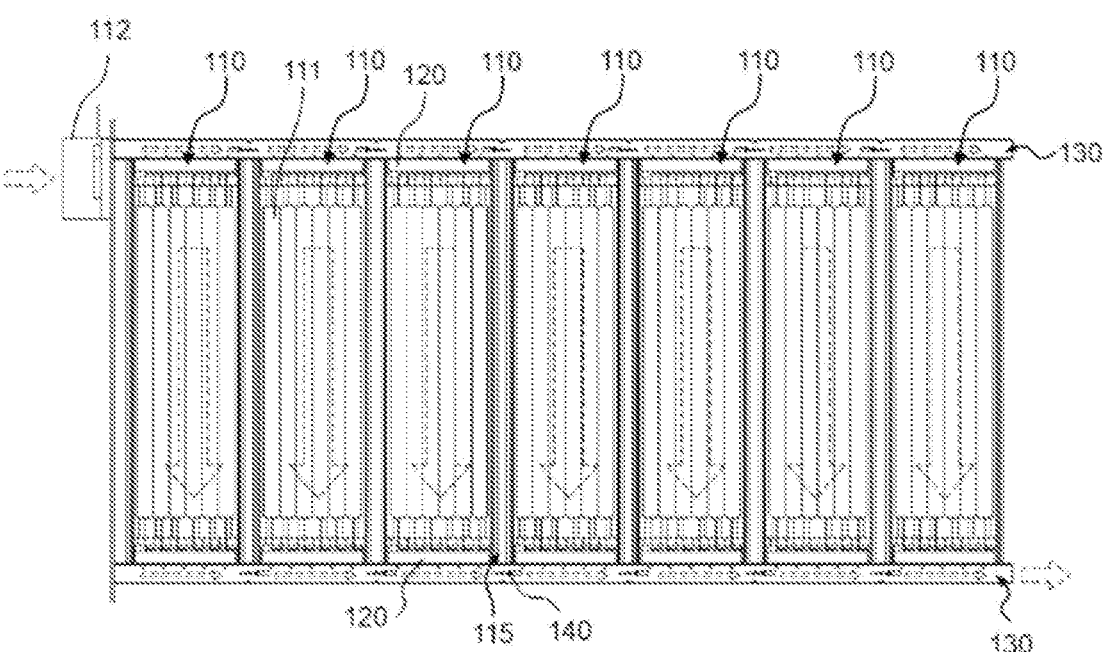

【FIG. 3】
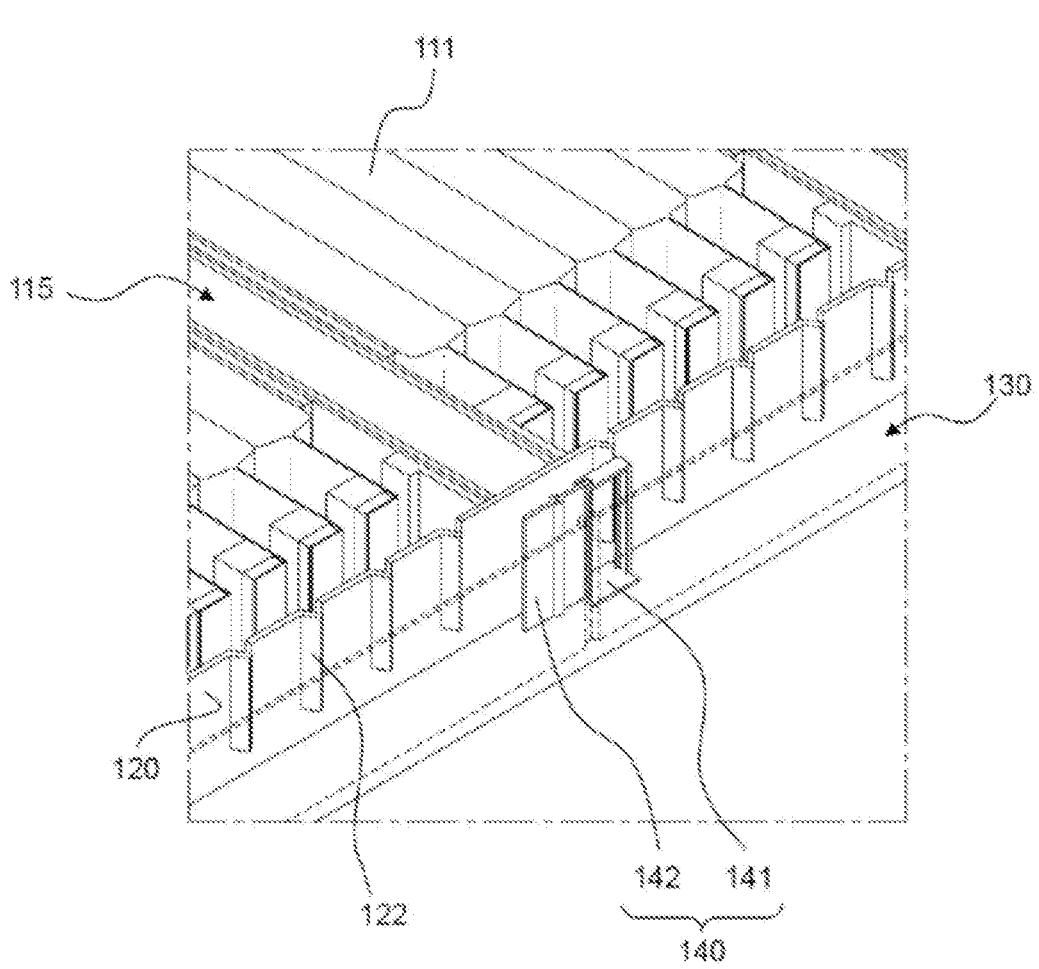

【FIG. 4】
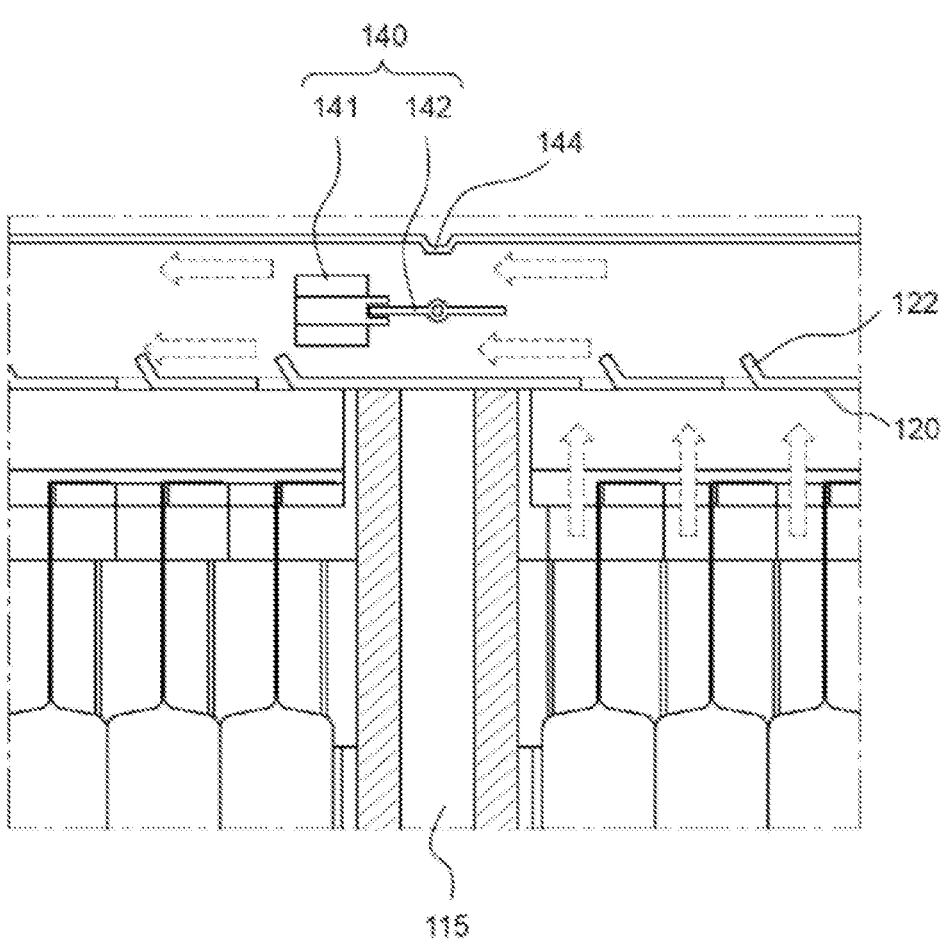

【FIG. 5】
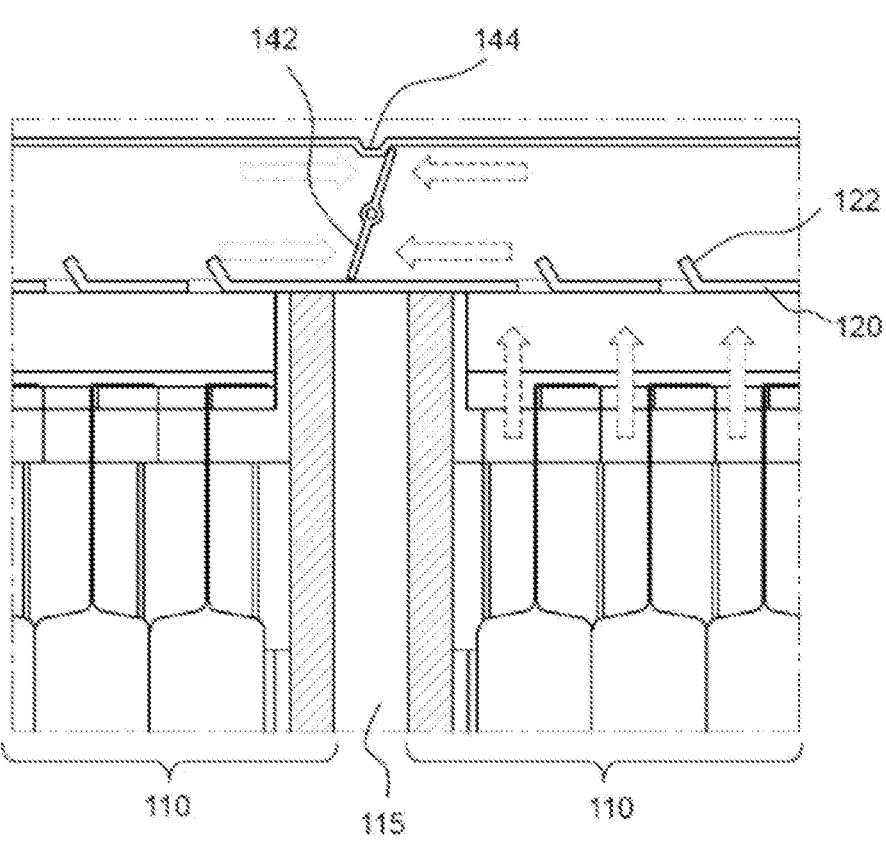

【FIG. 6】
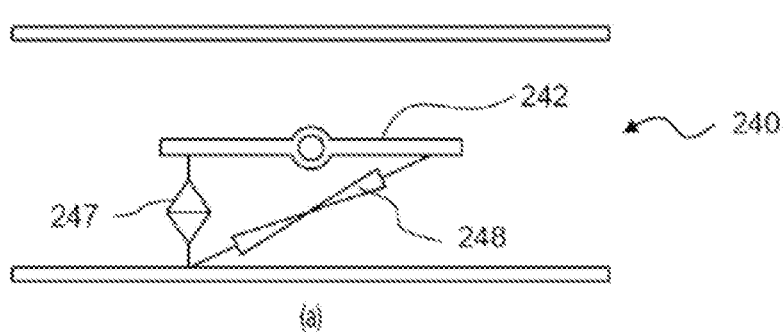
(a)
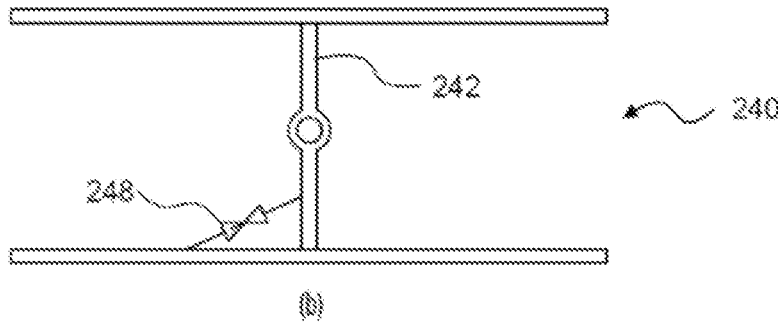
(b)
【FIG. 7】
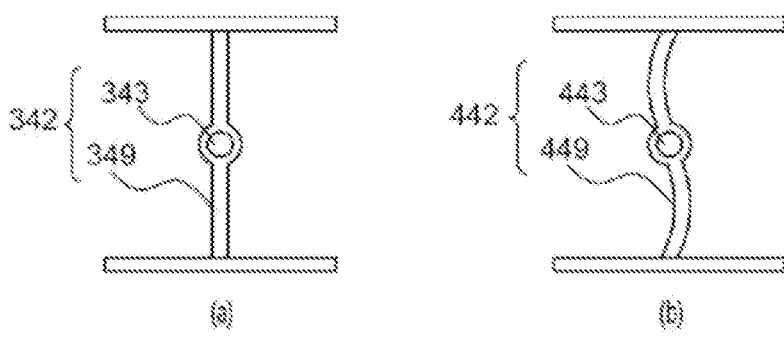
(a)              (b)

BATTERY MODULE INCLUDING GAS CUTOFF STRUCTURE

TECHNICAL FIELD

This application claims the benefit of priority to Korean Patent Application No. 2020-0039868 filed on Apr. 1, 2020, the disclosure of which is incorporated herein by reference in its entirety.

The present invention relates to a battery module including a gas cutoff structure, and more particularly to a battery module including a gas cutoff structure disposed in a duct that communicates with battery cell module assemblies such that, in the case in which fire breaks out in a specific battery cell module assembly, flames are prevented from spreading to battery cell module assemblies adjacent thereto.

BACKGROUND ART

A secondary battery has different configurations depending on output and capacity required in fields or products to which the secondary battery is applied. For example, small mobile devices, such as a mobile phone, a digital camera, and a laptop computer, use a single battery cell or a small battery pack including about ten battery cells per device so as to correspond to a small, light, and thin trend of corresponding products. On the other hand, medium or large devices, such as an electric bicycle, an electric vehicle, and a hybrid electric vehicle, use a medium or large battery pack including a plurality battery cells electrically connected to each other due to necessity of high output and large capacity.

In general, the size and weight of a battery pack are directly related to the accommodation space and output of a corresponding medium or large device, and therefore manufacturers are trying to manufacture small and light battery packs.

During charging and discharging of the secondary battery, heat is generated in the secondary battery, whereby the temperature of the secondary battery increases. In the case in which the secondary battery abnormally operates or in the case in which the internal structure of the secondary battery is damaged by external impact, combustion and outbreak of fire may occur in the secondary battery.

In particular, an electrode terminal region of a battery cell for secondary batteries is a region upon which heat is concentrated, and may serve as a path through which flames are discharged outside when fire breaks out in the battery cell due to a high-temperature phenomenon of the battery cell.

Meanwhile, in the case in which a plurality of battery cell module assemblies constituting a battery module is disposed in a battery module housing so as to communicate with each other without being individually divided, when fire breaks out in a specific battery cell module assembly, heat and flames may spread to battery cell module assemblies adjacent thereto, whereby fire may be enlarged.

Also, in many cases, a battery pack is configured to have an open structure in which a busbar for electrical connection between battery cells or battery modules received in the battery pack and a connector for connection with an external system are coupled to the battery pack and in which a heat dissipation fan configured to discharge heat from the battery pack is installed in the battery pack.

Since the battery pack has a structure in which it is difficult for movement of a material between the inside and the outside of the battery pack to be completely cut off, as described above, flames generated in the battery pack may be easily transfer to a region adjacent thereto, and air including oxygen may be continuously supplied into the battery pack from outside the battery pack, whereby the state in which fire breaks out may continue.

In connection therewith, Patent Document 1 discloses a battery pack including a thermal expansion member configured to prevent external air from being introduced into a battery pack case when fire breaks out in a battery module, and Patent Document 2 discloses a battery pack including a structure configured to be deformed by overheating at the time of battery abnormality so as to close an opening of a battery pack case.

However, Patent Document 1 and Patent Document 2 do not suggest a structure capable of preventing flames generated in a battery pack from spreading in the battery pack.

Therefore, there is an increasing necessity for a battery module including a structure capable of preventing introduction of external air when fire breaks out in a battery pack and cutting off movement of gas such that flames in a battery cell module assembly that has caught fire do not spread to battery cell module assemblies adjacent thereto.

PRIOR ART DOCUMENTS (Patent Document 1) Japanese Patent Application Publication No. 2015-153616 (2015.08.24)

(Patent Document 2) Japanese Patent Application Publication No. 2016-201333 (2016 Dec. 1)

DISCLOSURE

Technical Problem

The present invention has been made in view of the above problems, and it is an object of the present invention to provide a battery module including a gas cutoff structure capable of circulating air in order to prevent an increase in temperature of the battery module and cutting off movement of air and flames to prevent consecutive breakout of fire when fire breaks out in the battery module.

Technical Solution

In order to accomplish the above object, a battery module according to the present invention includes a plurality of battery cell module assemblies, each of the plurality of battery cell module assemblies including a plurality of battery cells arranged in tight-contact with each other, a side plate electrically connected to electrode leads of the plurality of battery cell module assemblies, a duct disposed outside the side plate, and a gas cutoff disposed in the duct, wherein the plurality of battery cell module assemblies is disposed so as to have a space therebetween.

The side plate may have an open structure such that the plurality of battery cell module assemblies communicate with the duct.

Each of the plurality of battery cell module assemblies may have a housing receiving the plurality of battery cells, and an open surface of the housing may be coupled to the side plate.

The side plate may have an integrated structure that covers the entire side surface of the battery module in which the electrode leads of the plurality of battery cell module assemblies protrude.

The gas cutoff may be disposed in the duct at a position corresponding to the space.

The side plate may include a first side plate and a second side plate located respectively at opposite ends of the plurality of battery cell module assemblies in an overall length direction thereof, and a first duct may be located outside the first side plate and a second duct may be located outside the second side plate.

A refrigerant may be introduced through a first end of the first duct, passes through the plurality of battery cell module assemblies, and is discharged through a second end of the second duct.

The gas cutoff may include a cutoff membrane configured to open and close the duct and a fixing portion configured to fix the cutoff membrane, and, when heat is generated in the battery module, the fixing portion is melted, whereby the fixed state of the cutoff membrane is released, the cutoff membrane may be rotated such that the flow of gas through the duct is cut off.

The gas cutoff may include a cutoff membrane configured to open and close the duct, a temperature fuse connected to a first end of the cutoff membrane, and an elastic body connected to a second end of the cutoff membrane opposite the first end of the cutoff membrane, and, when heat is generated in the battery module, the temperature fuse is cut off, the cutoff membrane may be rotated by elastic force of the elastic body, whereby the flow of gas through the duct may be cut off.

The cutoff membrane may include two blades extending from a central axis for rotation, and the blades may have a straight shape or a spiral shape when viewed from one end of the central axis.

An inner surface of the duct may be provided with a projection configured to stop rotation of the cutoff membrane.

The projection may be formed by a portion of the duct being depressed inwards or may have a structure in which a protrusion is attached to the inner surface of the duct.

In addition, the present invention provides a battery pack including the battery module.

Advantageous Effects

As is apparent from the above description, a battery module according to the present invention is configured such that battery cell module assemblies are received in independent housings, and therefore a duct may be provided outside a side plate as a path for air circulation.

Also, in the battery module, air introduced through the duct is circulated so as to pass through the battery cell module assemblies and to then be discharged, whereby it is possible to cool the battery module.

In addition, it is possible to prevent flames in a specific battery cell module assembly from spreading to battery cell module assemblies adjacent thereto by the provision of a gas cutoff structure disposed in the duct through which the air is circulated.

In addition, it is possible to reuse the battery module through replacement of the battery cell module assembly that has caught fire.

DESCRIPTION OF DRAWINGS

FIG. 1 is a perspective view of a battery module according to the present invention.

FIG. 2 is a plan view of the battery module of FIG. 1 in the state in which the upper surface of a battery cell module assembly is removed therefrom.

FIG. 3 is a partial enlarged view of the battery module of FIG. 1.

FIG. 4 is a partial enlarged view showing the state of a gas cutoff structure before operation thereof.

FIG. 5 is a partial enlarged view showing the state in which the gas cutoff structure of FIG. 4 is operated.

FIG. 6 is a plan view showing a gas cutoff structure according to an embodiment.

FIG. 7 is a plan view showing the shape of a cutoff membrane of the gas cutoff structure.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention of the present application and the claims, singular forms are intended to include plural forms unless mentioned otherwise.

Also, in the description of the invention of the present application and the claims, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Hereinafter, embodiments of the present invention will be described in detail with reference to the accompanying drawings.

FIG. 1 is a perspective view of a battery module according to the present invention, and FIG. 2 is a plan view of the battery module of FIG. 1 in the state in which the upper surface of a battery cell module assembly is removed therefrom.

Referring to FIGS. 1 and 2, the battery module 100 according to the present invention is configured such that a plurality of battery cell module assemblies 110 is disposed so as to have a space 115 therebetween and battery cells 111 are arranged in each of the battery cell module assemblies 110 in tight contact with each other.

Each of the battery cell module assemblies 110 is configured such that a plurality of battery cells 111 is received in a housing, and the battery cell module assemblies are independently disposed in a battery module housing in the state in which the battery cell module assemblies are received in individual housings.

Since the present invention includes battery cell module assemblies, each of which uses an independent housing, as described above, it is possible to solve a conventional problem in that the battery cell module assemblies are disposed in the battery module housing in an open state, i.e. in the state in which the battery cell module assemblies are not received in individual housings, whereby flames easily spread when fire breaks out.

The housing of each of the battery cell module assemblies 110 is formed so as to have a mono frame shape, and therefore the housing has a structure that is open in a direction in which electrode leads protrude. The battery module is assembled by coupling a side plate 120 to an open surface of the housing including the open structure.

The side plate 120 electrically connected to the electrode leads of the battery cells 111 includes a first side plate and a second side plate located respectively at opposite ends of the battery cell module assemblies 110 in an overall length direction thereof.

The side plate 120 is configured to have an integrated structure that covers the entirety of a first surface of the battery cell module assemblies 110 in the direction in which the electrode leads protrude and a first surface of the space 115 defined between the battery cell module assemblies.

That is, the side plate 120 is configured to have a size capable of covering the entirety of the first surface formed by the plurality of battery cell module assemblies and the space therebetween.

As described above, the battery module according to the present invention is configured such that the battery cell module assemblies are received in individual housings and includes a side plate having an integrated structure, whereby no separate battery module case is necessary.

A duct 130 configured to allow air to flow therethrough is disposed outside of each of the first side plate and the second side plate. A first duct is located outside the first side plate, and a second duct is located outside the second side plate.

The battery module according to the present invention is configured to have a structure in which air introduced through the duct passes through the battery cell module assemblies and is discharged through the opposite duct. Consequently, the side plate may be configured to have an open structure such that the battery cell module assemblies communicate with the duct in order to circulate air.

In a concrete example, air that functions as a refrigerant is introduced into the battery modules from outside the battery modules through a fan 112 connected to one end of the first duct. As indicated by dotted arrows of FIG. 2, the air is introduced through a first end of the first duct, passes through the side plate configured to have the open structure, passes through the battery cell module assemblies 110, passes through the opposite side plate configured to have the open structure, and is discharged through a second end of the second duct.

It is possible to cool the heated battery module through the flow of air described above.

Meanwhile, in connection with the structure of the duct according to the present invention, the side plate may constitute one side surface of the duct 130. Alternatively, a separate square-pillar-shaped duct may be disposed outside the side plate, and a structure that communicates with the battery cell module assemblies through the side plate may be formed at one side surface of the duct that overlaps the side plate.

FIG. 3 is a partial enlarged view of the battery module of FIG. 1, FIG. 4 is a partial enlarged view showing the state of a gas cutoff structure before operation thereof, and FIG. 5 is a partial enlarged view showing the state in which the gas cutoff structure of FIG. 4 is operated.

Referring to FIGS. 3 to 5, the gas cutoff structure 140 is located in the duct 130. Specifically, the gas cutoff structure 140 is located in the duct 130 at a position corresponding to the space 115 so as to prevent flames from moving between adjacent battery cell module assemblies 110.

The side plate 120 includes an opening portion 122 formed by cutting and bending a portion of the side plate such that the battery cell module assemblies communicate with the duct 130.

The shape of the opening portion is not limited to the shape shown in FIGS. 3 to 5, and the opening portion may be formed as a through-hole or a slit.

The gas cutoff structure 140 includes a cutoff membrane 142 configured to open and close the duct 130 and a fixing portion 141 configured to fix the cutoff membrane 142.

FIG. 4 shows the state in which the fixing portion 141 holds the cutoff membrane 142 to fix the cutoff membrane in the case in which the battery module is in a normal state. The cutoff membrane 142 is disposed in parallel to a direction in which air flows (indicated by dotted arrows).

The structure of the fixing portion is not limited to the structure shown in FIG. 4, and is not particularly restricted as long as the fixing portion is capable of stably holding and fixing the cutoff membrane in a normal state and is capable of being rapidly melted such that the fixed state of the cutoff membrane is released when heat is generated or when fire breaks out.

FIG. 5 shows the state in which heat is generated in the right-side battery cell module assembly 110, whereby the fixing portion 141 is melted, and therefore the fixed state of the cutoff membrane 142 is released. The fixing portion 141 is made of a material that is capable of being melted at high temperature. For example, the fixing portion may be made of a polymer resin having a glass transition temperature or a melting point of 300° C. or lower.

When the fixing portion 141 is melted, the fixed state of the cutoff membrane 142 is released, whereby the cutoff membrane is rotated by the flow of gas that flows in the duct.

Specifically, gas heated in the right-side battery cell module assembly 110 moves leftwards in the figure, air introduced into the battery module from outside the battery module through the fan is introduced rightwards in the figure, and the cutoff membrane 142 rotated by the pressure difference between the heated gas and the introduced air is caught by a projecting portion 144 formed on the inner surface of the duct 130, whereby rotation of the cutoff membrane is stopped.

The flow of the gas that flows in the duct is cut off by the cutoff membrane 142 stopped as described above, whereby it is possible to prevent the heated gas from spreading to battery cell module assemblies adjacent thereto, and it is also possible to prevent external air including oxygen from being introduced into the battery cell module assembly that has caught fire to thus prevent the battery cell module assembly from continuously burning.

FIG. 6 is a plan view showing a gas cutoff structure according to an embodiment.

Referring to FIG. 6, the gas cutoff structure 240 includes a cutoff membrane 242 configured to open and close the duct, a temperature fuse 247 connected to a first end of the cutoff membrane 242, and an elastic body 248 connected to a second end of the cutoff membrane 242 opposite the first end of the cutoff membrane. When heat is generated in the battery module, the temperature fuse 247 is cut off, and the cutoff membrane 242 is rotated by elastic force of the elastic body 248, whereby the duct is completely clogged. As a result, the flow of gas through the duct is cut off.

As described with reference to FIG. 5, therefore, it is possible to prevent the heated gas from spreading to battery cell module assemblies adjacent thereto, and it is also possible to prevent external air including oxygen from being introduced into the battery cell module assembly that has caught fire to thus prevent the battery cell module assembly from continuously burning.

Although omitted from FIG. 6, the projecting portion formed on the inner surface of the duct of FIG. 5 may also be formed on the inner surface of the duct of FIG. 6, and rotation of the cutoff membrane may be stopped by the projecting portion.

In addition, although the state in which the projecting portion is formed on the inner surface of the outside part of the duct is shown in FIG. 5, the projecting portion may be formed on the inner surface of the bottom of the duct or may be formed on the inner surface of the side plate.

FIG. 7 is a plan view showing the shape of the cutoff membrane of the gas cutoff structure.

The cutoff membrane 342 shown in FIG. 7(*a*), which is identical in shape to each of the cutoff membranes 142 and 242 shown in FIGS. 5 and 6, includes two blades 349 extending from a central axis 343 for rotation in opposite directions. The blades 349 are formed so as to have a straight shape when viewed from one end of the central axis 343.

The cutoff membrane 442 shown in FIG. 7(*b*) includes two blades 449 extending from a central axis 443 for rotation in opposite directions. The blades 449 are formed so as to have a spiral shape when viewed from one end of the central axis 443.

Although omitted from FIG. 7, the projecting portion formed on the inner surface of the duct of FIG. 5 may also be formed on the inner surface of the duct of FIG. 7, and rotation of the cutoff membrane may be stopped by the projecting portion.

In the gas cutoff structure according to the present invention, as described above, the cutoff membrane is rapidly rotated by the pressure difference in gas that passes through the duct, whereby it is possible to completely cut off the gas that passes through the duct. Consequently, it is possible to prevent spread of flames and heat generated in the battery cell module assemblies and to prevent air outside the battery module from being introduced into the battery module, whereby it is possible to prevent enlargement to large-scale fire.

Those skilled in the art to which the present invention pertains will appreciate that various applications and modifications are possible within the category of the present invention based on the above description.

DESCRIPTION OF REFERENCE NUMERALS

100: Battery module
110: Battery cell module assembly
111: Battery cell
112: Fan
115: Space
120: Side plate
122: Opening portion
130: Duct
140, 240: Gas cutoff structures
141: Fixing portion

142, 242, 342, 442: Cutoff membranes
144: Projecting portion
247: Temperature fuse
248: Elastic body
343, 443: Central axes
349, 449: Blades

INDUSTRIAL APPLICABILITY

As is apparent from the above description, a battery module according to the present invention is configured such that battery cell module assemblies are received in independent housings, and therefore a duct may be provided outside a side plate as a path for air circulation.

Also, in the battery module, air introduced through the duct is circulated so as to pass through the battery cell module assemblies and to then be discharged, whereby it is possible to cool the battery module.

In addition, it is possible to prevent flames in a specific battery cell module assembly from spreading to battery cell module assemblies adjacent thereto by the provision of a gas cutoff structure disposed in the duct through which the air is circulated.

In addition, it is possible to reuse the battery module through replacement of the battery cell module assembly that has caught fire.

The invention claimed is:

1. A battery module comprising:
a plurality of battery cell module assemblies, each of the plurality of battery cell module assemblies comprising a plurality of battery cells arranged in contact with each other;
a side plate electrically connected to electrode leads of the plurality of battery cell module assemblies;
a duct formed between the side plate and an external wall spaced from the side plate; and
a gas cutoff disposed in the duct,
wherein the plurality of battery cell module assemblies is disposed so as to have a space therebetween,
wherein the gas cutoff comprises a cutoff membrane configured to open and close the duct, a temperature fuse connected to a first end of the cutoff membrane, and an elastic body connected to a second end of the cutoff membrane opposite the first end of the cutoff membrane,
wherein, when heat is generated in the battery module, the temperature fuse is cut off, the cutoff membrane is rotated by elastic force of the elastic body, whereby a flow of gas through the duct is cut off, and
wherein an inner surface of the duct is provided with a projection configured to stop rotation of the cutoff membrane.

2. The battery module according to claim 1, wherein the side plate has an open structure such that the plurality of battery cell module assemblies communicate with the duct.

3. The battery module according to claim 1, wherein each of the plurality of battery cell module assemblies has a housing receiving the plurality of battery cells, and wherein an open surface of the housing is coupled to the side plate.

4. The battery module according to claim 1, wherein the side plate has an integrated structure that covers an entire side surface of the battery module in which the electrode leads of the plurality of battery cell module assemblies protrude.

5. The battery module according to claim 1, wherein the gas cutoff is disposed in the duct at a position corresponding to the space.

6. The battery module according to claim 1, wherein the projection is formed by a portion of the duct being depressed inwards or a protrusion attached to the inner surface of the duct.

7. A battery pack comprising the battery module according to claim 1.

8. The battery module according to claim 1, wherein the cutoff membrane comprises two blades extending from a central axis for rotation, and wherein the blades have a straight shape or a spiral shape when viewed from one end of the central axis.

9. The battery module according to claim 1, wherein the cutoff membrane is rotatable about a central axis formed between the side plate and the external wall.

10. The battery module according to claim 1, wherein the plurality of battery cell module assemblies are stacked in a first direction, wherein the duct extends in the first direction, and wherein the gas cutoff blocks flow in the first direction when closed.

11. The battery module according to claim 1, wherein the side plate comprises a first side plate and a second side plate located respectively at opposite ends of the plurality of battery cell module assemblies in an overall length direction thereof, and wherein a first duct is located outside the first side plate and a second duct is located outside the second side plate.

12. The battery module according to claim 11, wherein a refrigerant is introduced through a first end of the first duct, passes through the plurality of battery cell module assemblies, and is discharged through a second end of the second duct.

\* \* \* \* \*